Dec. 22, 1925.
W. PERRY
STUD BOLT TOOL
Filed Nov. 21, 1924
1,566,691
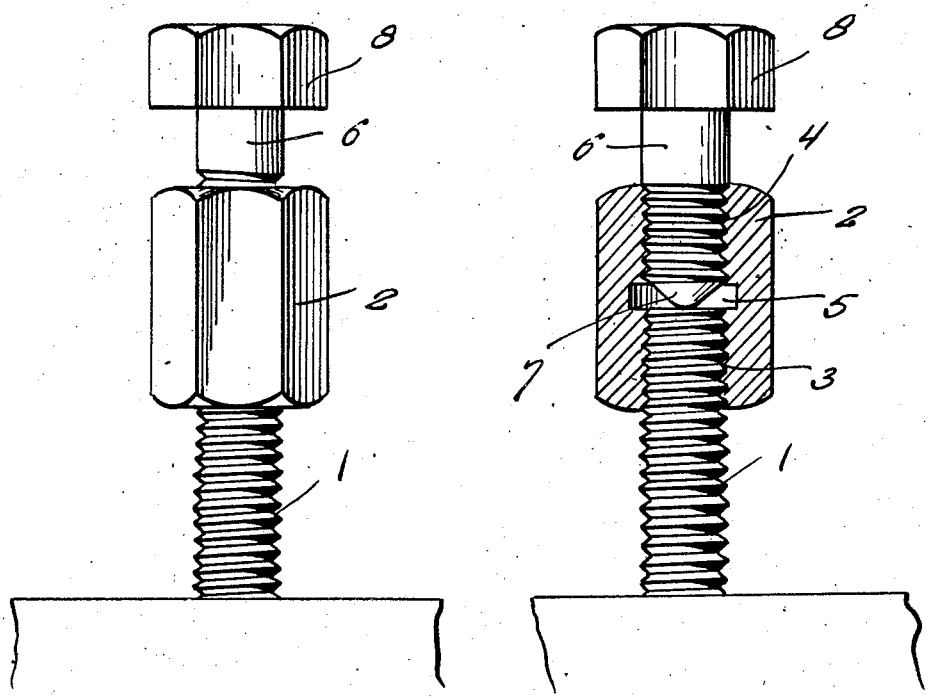
William Perry,
Inventor
By Clarence A. O'Brien
Attorney Patented Dec. 22, 1925.

1,566,691

UNITED STATES PATENT OFFICE.

WILLIAM PERRY, OF PROVINCETOWN, MASSACHUSETTS.

STUD-BOLT TOOL.

Application filed November 21, 1924. Serial No. 751,312.

*To all whom it may concern:*

Be it known that I, WILLIAM PERRY, a citizen of the United States, residing at Provincetown, in the county of Barnstable and State of Massachusetts, have invented certain new and useful Improvements in a Stud-Bolt Tool, of which the following is a specification.

This invention relates to improvements in tools and has for its principal object to provide a simple and efficient means for inserting or removing the stud bolt without stripping the threads thereof.

A further object of the invention is to provide a tool of the above mentioned character, which may be easily and readily placed in position on the outer end of a stud bolt, means being associated therewith for preventing the disengagement of the sleeve from the outer end of the stud bolt so that the device is rendered positive and efficient in its operation.

A further object is to provide a tool of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the tool embodying my invention showing the same associated with a stud bolt, and Figure 2 is a similar view with the sleeve shown in section.

In the drawing wherein for the purpose of illustration is shown the preferred embodiment of my invention, the numeral 1 designates a stud bolt which is of the conventional construction and as the use of the same is well known in the art, a further detailed description is not thought necessary. In securing a stud bolt in place, the threads of the stud bolt oftentimes becomes stripped or otherwise damaged so that when the stud bolt is removed from its support, the same is of no further use. In order that a stud bolt may be properly driven in place without damaging the threads thereof, I have provided a means which may be easily and readily associated with the outer end of a stud bolt and the same will be presently described.

The tool comprises a sleeve 2 which is substantially hexagonal in cross section. The sleeve has its lower portion provided with right handed threads illustrated at 3 for engagement with the outer end of the stud bolt 1 while the upper portion of the sleeve 2 is provided with left handed threads illustrated at 4, the purpose thereof will hereinafter be more fully described. The right and left handed threads respectively of the sleeve 2 are separated from each other by means of the recess 5 as is clearly illustrated in Figure 2.

The sleeve 2 is adapted to be threaded onto the outer end of the stud bolt 1, the right hand threads 3 engaging the outer threaded end of the stud bolt and the sleeve is secured on the stud bolt until the outer end of the bolt is disposed adjacent the recess 5. A locking bolt 6 is then threaded into the upper threaded portion of the sleeve, the threads thereof being disposed in opposite relation to the threads in the lower portion of the sleeve and the inner end of the bolt 6 terminates in the substantially conical portion 7, the same being adapted for engagement with the extreme outer end of the stud bolt 1. A hexagonal head 8 is associated with the outer end of the bolt 6 for facilitating the securing of the same in the upper portion of the sleeve 2.

When the locking bolt 6 is in the position as shown in Figure 2 of the drawing, the same will prevent the further rotation of the sleeve on the stud bolt and by applying a wrench or any other similar tool around the outer faces of the sleeve 2, the sleeve and the stud bolts will be rotated simultaneously so that the stud bolt may be driven in place. By rotating the sleeve with the locking bolt positioned in the upper portion thereof in the reverse direction, the stud bolt is adapted to be removed from its support. After the stud bolt has been driven into the support, the locking bolt 6 is removed and by rotating the sleeve in the opposite direction, the same may be readily detached from the outer end of the stud bolt.

The provision of a tool of the above mentioned character, will enable a stud bolt to be easily and efficiently driven into its support or removed therefrom without any possibility of the threads of the stud bolt becoming stripped or otherwise damaged which would result in rendering the stud bolt useless.

While I have shown the preferred embodiment of the invention, it is to be understood that various changes in the size, shape and arrangement of parts may be resorted to without departing from the spirit of the invention and the scope of the appended claims.

Having thus described my invention, what I claim is:—

A device of the class described comprising a sleeve, the lower portion thereof being internally threaded in one direction for threaded engagement with the outer end of a stud bolt, the upper portion of the sleeve being internally threaded in the opposite direction, said sleeve having a recess provided therein for separating the oppositely threaded portions thereof, and a locking bolt threaded in the upper portion of the sleeve and having its lower end cone-shaped and terminating in the recess so as to provide a pointed terminal to engage the outer end of the stud bolt for preventing the rotation of the sleeve on the stud bolt when the outer end of the stud bolt is threaded in the lower portion of the sleeve, whereby the sleeve and stud bolt are adapted for simultaneous rotation when an implement engages and rotates the sleeve.

In testimony whereof I affix my signature.

WILLIAM PERRY.